US012228238B2

(12) United States Patent
Ferraris et al.

(10) Patent No.: US 12,228,238 B2
(45) Date of Patent: Feb. 18, 2025

(54) SUPPORTING DEVICE FOR A PORTABLE PROCESSING AND/OR TELECOMMUNICATION APPARATUS OR AN ACCESSORY

(71) Applicant: FERRARIS GROUP S.A.G.L., Chiasso (CH)

(72) Inventors: Carlo Edoardo Ferraris, Chiasso (CH); Lorenzo Filiberto Ferraris, Casciago (IT)

(73) Assignee: FERRARIS GROUP S.A.G.L., Chiasso (CH)

( * ) Notice: Subject to any disclaimer, the term of this patent is extended or adjusted under 35 U.S.C. 154(b) by 0 days.

(21) Appl. No.: 18/328,145

(22) Filed: Jun. 2, 2023

(65) Prior Publication Data
US 2024/0110661 A1 Apr. 4, 2024

(30) Foreign Application Priority Data

Oct. 4, 2022 (IT) .......................... 202022000003987

(51) Int. Cl.
*F16M 11/06* (2006.01)
*F16M 11/04* (2006.01)
*F16M 13/02* (2006.01)

(52) U.S. Cl.
CPC ........... *F16M 11/06* (2013.01); *F16M 11/041* (2013.01); *F16M 13/022* (2013.01); *F16B 2200/83* (2023.08)

(58) Field of Classification Search
CPC .... F16M 11/06; F16M 11/041; F16M 13/022; F16B 2200/83
(Continued)

(56) References Cited

U.S. PATENT DOCUMENTS 4,555,128 A * 11/1985 White ................... A47B 23/043
281/31
4,875,654 A * 10/1989 Chandonnet ............. A47G 1/17
248/467
(Continued)

FOREIGN PATENT DOCUMENTS

AU         2021102895 A4 *  8/2021  ............. A47B 97/00
CN         217108921 U    *  8/2022  ............. F16M 11/10
(Continued)

OTHER PUBLICATIONS

EDGE Pro—Bring True Modularity To Your Workstation. (Oct. 11, 2022). Kickstarter. Retrieved Jun. 25, 2024, from https://www.kickstarter.com/projects/rollingsquare/edge-pro-bring-true-modularity-to-your-workstation (Year: 2022).*

(Continued)

*Primary Examiner* — Taylor Morris
(74) *Attorney, Agent, or Firm* — Ferguson Case Orr Paterson

(57) ABSTRACT

A supporting device for a portable processing and/or telecommunication apparatus or an accessory having a first portion adapted to be supported by a supporting structure and a second portion having magnetic elements for retaining the portable processing and/or telecommunication apparatus or accessory is provided. The first and second portions are joined together in pivotable manner through a hinge allowing rotation of one of the first and second portions with respect to the other. The supporting device is adapted to assume a first configuration of minimum size in which the second portion is superimposed on the first portion, and at least a second configuration of use in which the second portion is rotated at a selectable angle with respect to the first portion, the first and second portions being hinged so that the
(Continued)

supporting device opens like a book from the configuration of minimum size to a selected configuration of use.

10 Claims, 9 Drawing Sheets

(58) Field of Classification Search
USPC .................................................. 248/288.11
See application file for complete search history.

(56) References Cited

U.S. PATENT DOCUMENTS

| | | | | |
|---|---|---|---|---|
| 5,682,653 | A * | 11/1997 | Berglof | G09F 1/10 224/183 |
| 6,405,983 | B1 * | 6/2002 | Goj | A47G 1/17 248/205.5 |
| 6,971,147 | B2 * | 12/2005 | Halstead | A45C 1/06 24/303 |
| 8,823,477 | B2 * | 9/2014 | Malanczyj | H01F 7/04 335/295 |
| 9,356,640 | B2 * | 5/2016 | Lambert | G06F 1/1632 |
| 9,565,909 | B2 * | 2/2017 | Song | G06F 1/166 |
| 9,800,283 | B2 * | 10/2017 | Schmidt | A45C 13/1069 |
| 9,891,504 | B2 * | 2/2018 | Fromm | G03B 17/563 |
| 10,066,784 | B2 * | 9/2018 | Wessels | F16M 11/10 |
| 10,173,292 | B2 * | 1/2019 | Fullerton | B23P 15/001 |
| 10,237,384 | B2 * | 3/2019 | Holder | H04M 1/04 |
| 10,327,538 | B2 * | 6/2019 | Alexander | A45F 5/02 |
| 10,563,683 | B2 * | 2/2020 | Lebovitz | F16B 11/006 |
| 10,583,790 | B2 * | 3/2020 | Wang | F16M 13/00 |
| 10,703,297 | B1 * | 7/2020 | Cohen | B60N 3/103 |
| 10,880,423 | B2 * | 12/2020 | Ajani | F16M 11/041 |
| 11,784,675 | B2 * | 10/2023 | Zhang | H04M 1/04 455/575.1 |
| 2002/0117593 | A1 * | 8/2002 | Richter | H04M 1/04 248/309.1 |
| 2005/0023420 | A1 * | 2/2005 | Sadeh | B42F 11/04 248/206.5 |
| 2016/0150861 | A1 * | 6/2016 | Yao | H04B 1/3888 224/245 |
| 2021/0332943 | A1 * | 10/2021 | Hippley | F16M 13/022 |
| 2023/0332732 | A1 * | 10/2023 | Fan | F16M 13/022 |

FOREIGN PATENT DOCUMENTS

| | | | | |
|---|---|---|---|---|
| DE | 202022102681 | U1 * | 8/2022 | ........... F16M 13/022 |
| WO | WO-2014131787 | A1 * | 9/2014 | ........... F16M 11/041 |
| WO | WO-2022155560 | A2 * | 7/2022 | ................ F16B 1/00 |

OTHER PUBLICATIONS

Amazon.com: ALAFLY 2 Pack Metal Base Plate Only Magnetic Phone Holder. (Aug. 26, 2023). Amazon. Retrieved Jun. 25, 2024, from https://www.amazon.com/ALAFLY-Magnetic-Holder-Include-Everywhere/dp/BOCGNH5PKF?ref_=ast_sto_dp (Year: 2023).*

* cited by examiner

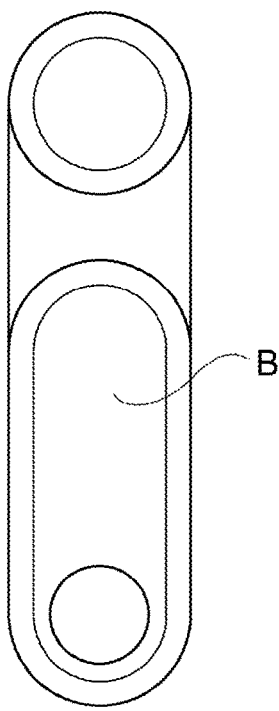
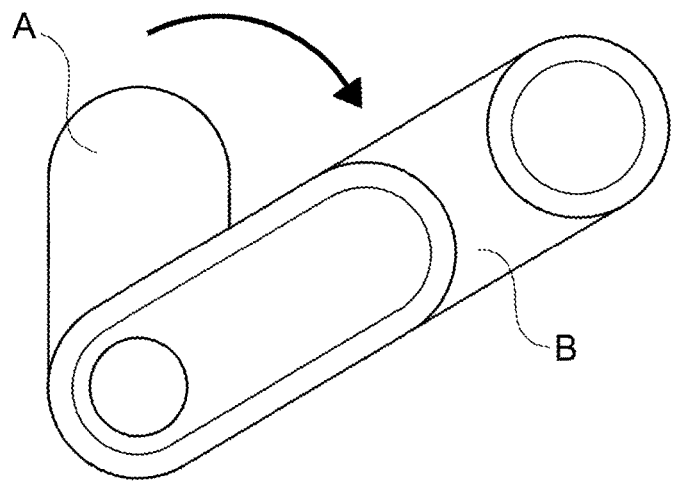
FIG.1a
(PRIOR ART)
FIG.1b
(PRIOR ART)
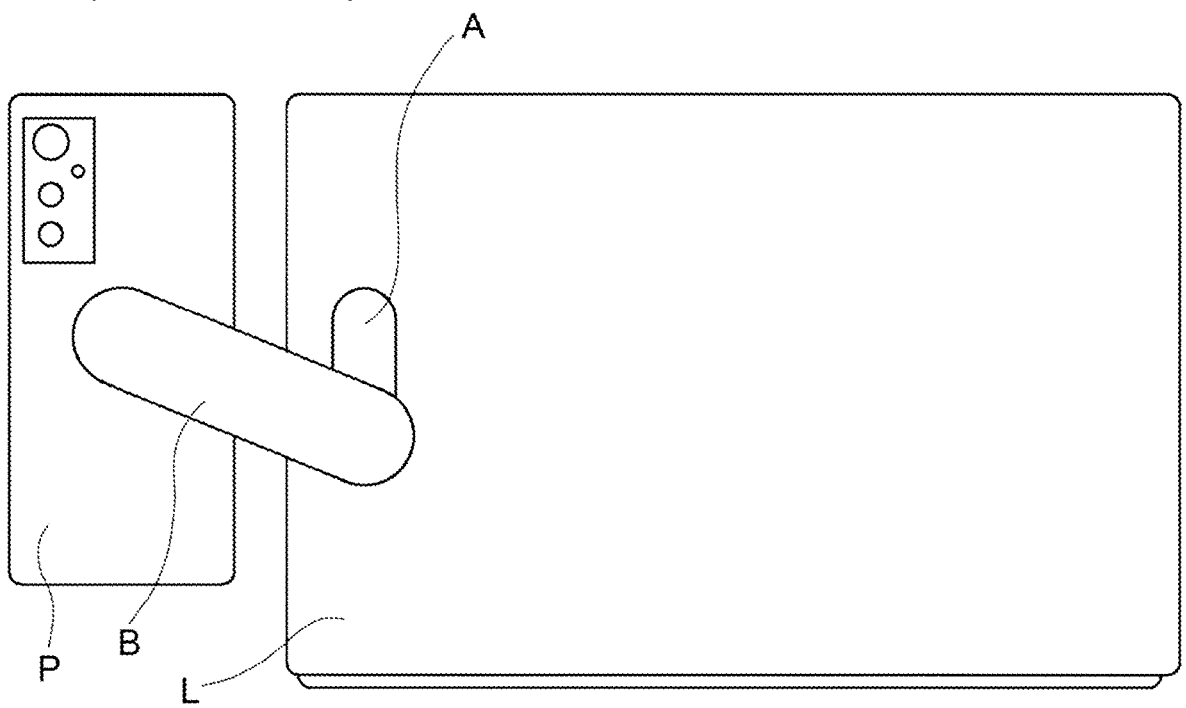
FIG.2
(PRIOR ART)

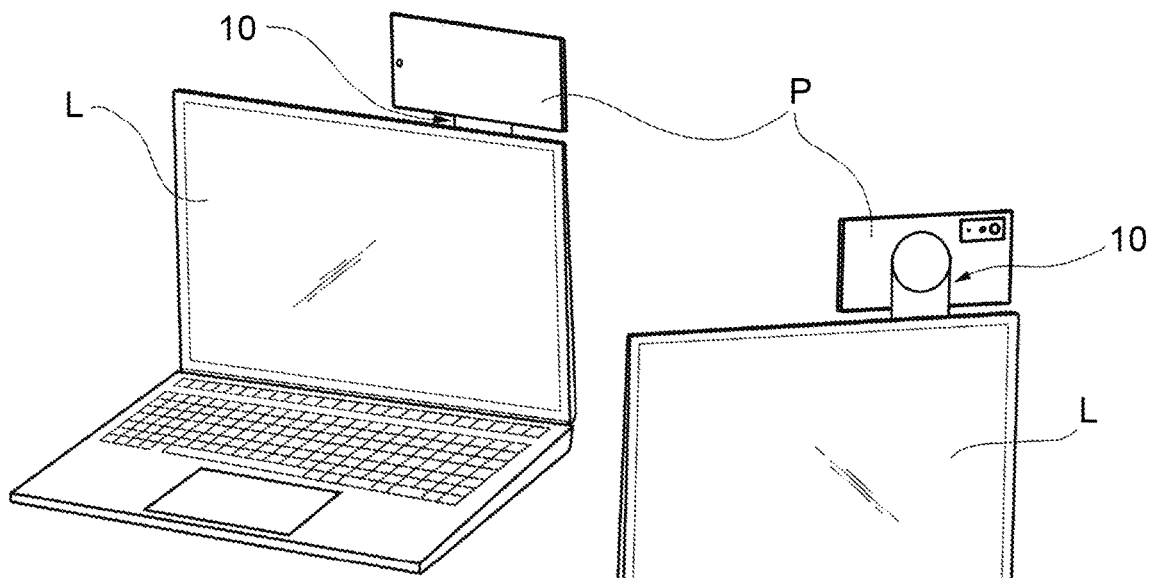
FIG.9a
FIG.9b
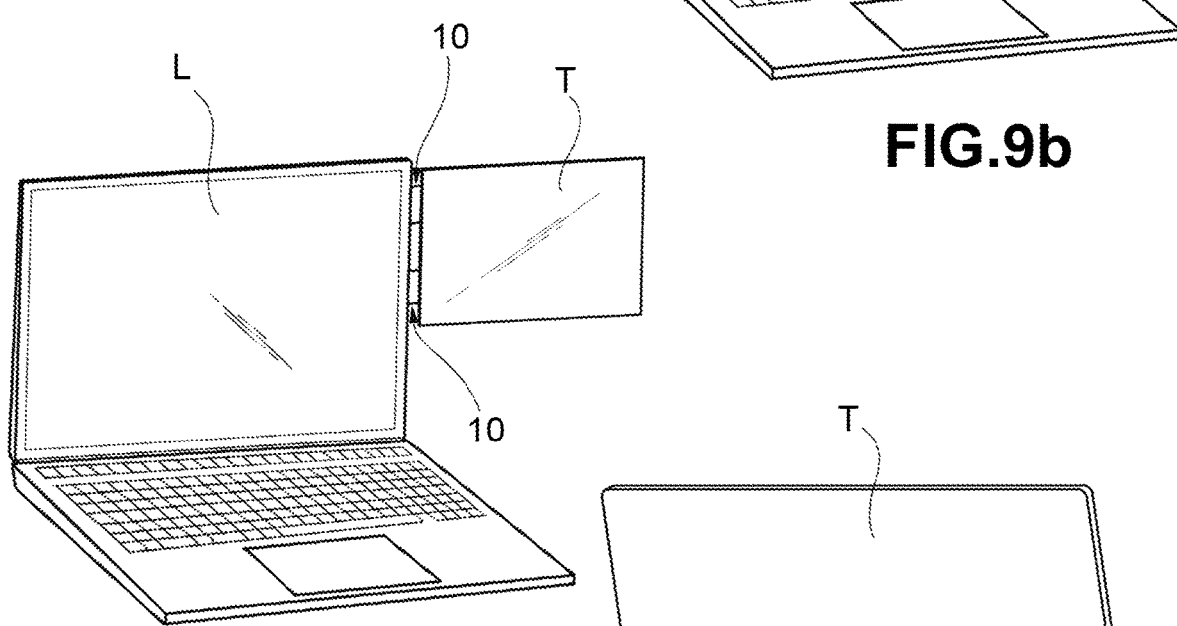
FIG.9c
FIG.9d

SUPPORTING DEVICE FOR A PORTABLE PROCESSING AND/OR TELECOMMUNICATION APPARATUS OR AN ACCESSORY

CROSS REFERENCE TO RELATED APPLICATION

This application claims priority to and benefit of Italian Utility Model Application No. 202022000003987, filed on Oct. 4, 2022, which is fully incorporated by reference herein in its entirety.

FIELD OF THE INVENTION

The present invention relates to stands, and in particular to a supporting device for a portable processing and/or telecommunication apparatus or an accessory, preferably but not limited for the coupling of a portable processing and/or telecommunication apparatus or an accessory to a supporting structure.

Such a supporting device is, for example, employed for arranging a portable processing and/or telecommunication apparatus, such as a smartphone or a tablet, side by side with a display screen of a computer, such as a monitor or laptop screen. Advantageously, it may also be used to arrange an accessory, such as a mobile phone charger or light, side by side with the display screen of a computer. Without any change to its structure, and within the general idea of the definition given above, such a supporting device may also be associated with a smartphone or tablet to pair with another smartphone (or tablet) or an accessory.

BACKGROUND OF THE INVENTION

In FIG. 1, a supporting device is shown according to the prior art, marketed by the company Rolling Square under the name Edge. It comprises a first and a second flat portions A, B joined together in a pivotable manner by a pin that allows the rotation of one portion with respect to the other in parallel planes. One of the two portions (portion A in the figure) is arranged to be stably coupled by adhesive to a supporting structure, such as the display screen of a computer, or rather to the shell bearing the display screen, at the rear thereof, while the other portion (portion B in the figure) bears magnetic means for retaining a portable processing and/or telecommunication apparatus, such as a smartphone, or an accessory, having a shell, a part thereof, an insert, or an adhering element made of metal.

In FIG. 1a, a configuration of minimum size of the supporting device is shown, wherein the two portions are superimposed in a facing condition, and, in FIG. 1b, a configuration of use is shown wherein the portion bearing the magnetic retaining means is rotated at an angle that may be selected with respect to the portion intended to be stably coupled to a supporting structure. In this configuration, as shown in FIG. 2, the portion A of the supporting device is coupled at the rear of the display screen of a laptop L (but may likewise be a monitor), in proximity to the edge, and the portion B is rotated by an angle sufficient to protrude outside the profile of the display screen in order to support a smartphone P in a position side by side with the screen. Naturally, although the figure shows a condition wherein the smartphone is coupled laterally to the screen, an appropriate placement of the supporting device would allow the smartphone to be coupled at the top of the screen.

Disadvantageously, such a supporting device in accordance with the prior art does not allow for extensive adjustment of the orientation of a portable processing and/or telecommunication apparatus or an accessory with respect to the display screen with which it is associated, but on the contrary is constrained to the inclination of the rear surface of the screen with respect to the lying surface of said screen.

Moreover, it proves to be unsuitable, if not completely ineffective, in the case of supporting structures other than a display screen.

SUMMARY OF THE INVENTION

The object of the present invention is to provide a satisfactory solution to the problems described above, avoiding the drawbacks of the prior art.

In particular, the object of the present invention is to provide a supporting device for a portable processing and/or telecommunication apparatus that allows optimal visibility of the apparatus for a user, i.e., that allows a portable processing and/or telecommunication apparatus or an accessory to be adjusted to an optimal position with respect to the display screen of a computer (e.g., a laptop or tablet) and, more generally, to the environment, and that is adaptable to a wide variety of supporting structures.

This object is achieved by a supporting device having the features described and claimed herein.

Particular embodiments are also described.

In summary, the present invention is based on the principle of constructing a supporting device having a structure that allows for an adjustable arrangement of the supported apparatus or accessory, for example an adjustable inclination with respect to a supporting structure to which the device may be coupled. The present invention also relates to the provision of magnetic coupling means that enable ease of use and maneuverability of the device, as well as its adaptability to different types of portable processing and/or telecommunication apparatuses or accessories.

Portable processing and/or telecommunication apparatuses that may be applied to the device include smartphones and tablets. Accessories that may be applied to the device include lamps or wireless charging bases for electronic devices.

Advantageously, a device made according to the present invention is easily adaptable to different types of support structures and may be coupled to them even temporarily. It may also be combined with other similar (identical) supporting devices to create complex support structures. Moreover, the structure of the device is such that a pair of supporting devices may be used together to extend the range of portable processing and/or telecommunication apparatuses or accessories, ensuring coupling stability at all times. Supporting structures to which the device may be applied (or arranged to be supported thereby) include, to name a few non-limiting examples, laptop screens, monitors, tablets, smartphones, walls, furniture elements or other similar supporting devices.

Even more advantageously, the structure of the device allows for the support of apparatuses or accessories in multiple orientations with respect to said device, on both faces of the device and simultaneously on both hinged portions of the device.

BRIEF DESCRIPTION OF THE FIGURES

Further features and advantages of the present invention will be presented in greater detail in the following detailed description of an embodiment thereof, given by way of non-limiting example, with reference to the accompanying drawings, wherein:

FIGS. 1a, 1b and 2 are views of a supporting device according to the prior art and of its use in association with a display screen of a computer, discussed above;

FIGS. 9a-9d show further ways of using the device of the present invention; and

In the figures, identical or functionally equivalent elements or components have the same reference numbers.

DETAILED DESCRIPTION

Figure 3A:
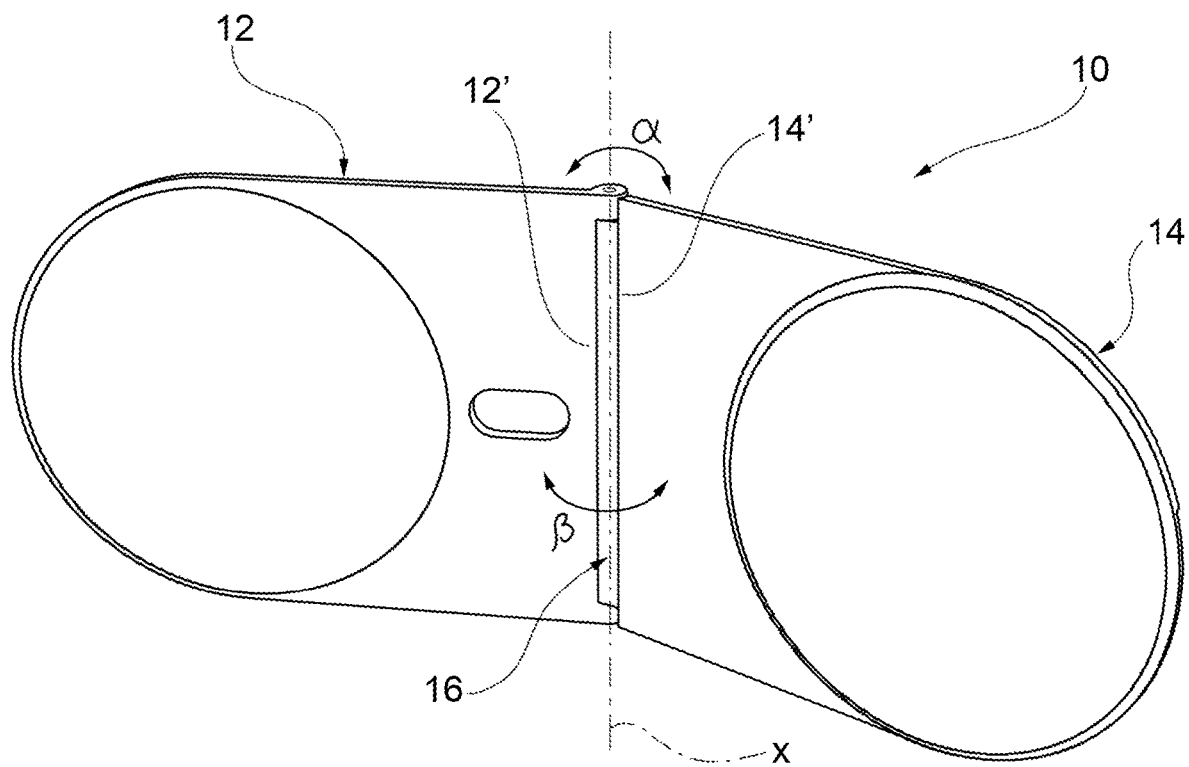
FIGS. 3a and 3b are perspective and lateral elevation views, respectively, of the supporting device of the present invention in a configuration of use.
Figure 3B:
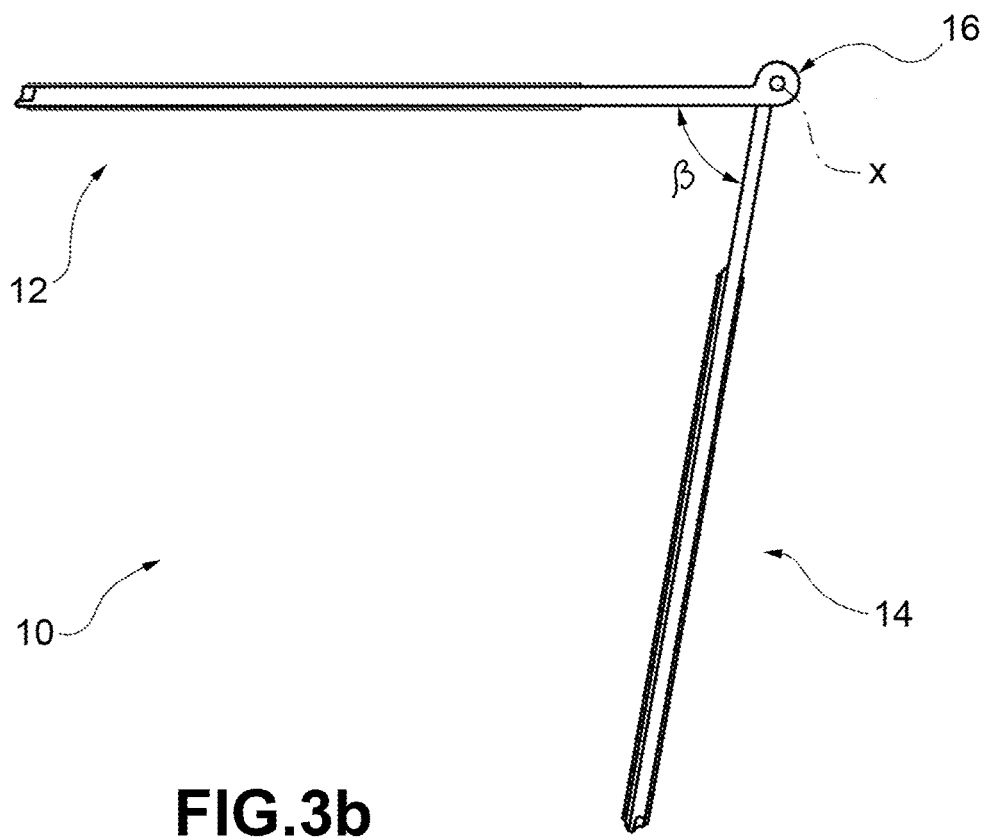
Figure 4A:
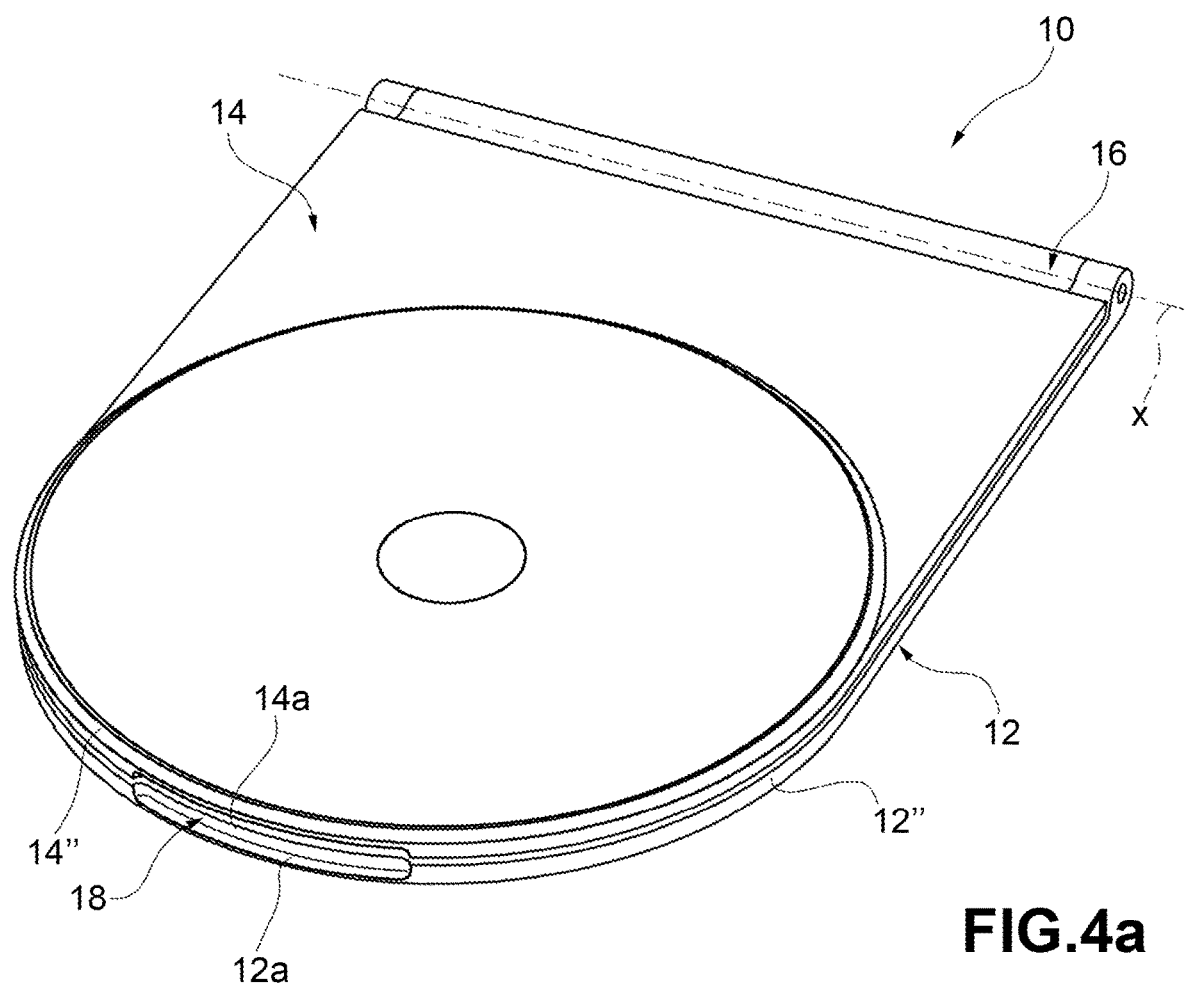
FIGS. 4a-4c are views from different angles of the device of the present invention in a minimum size or closed configuration.
Figure 4B:
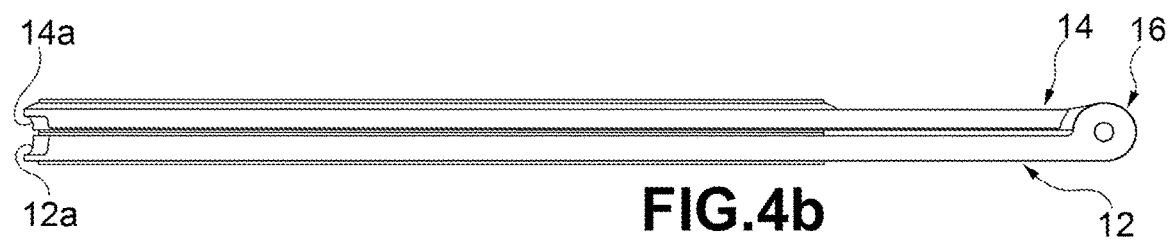
Figure 4C:
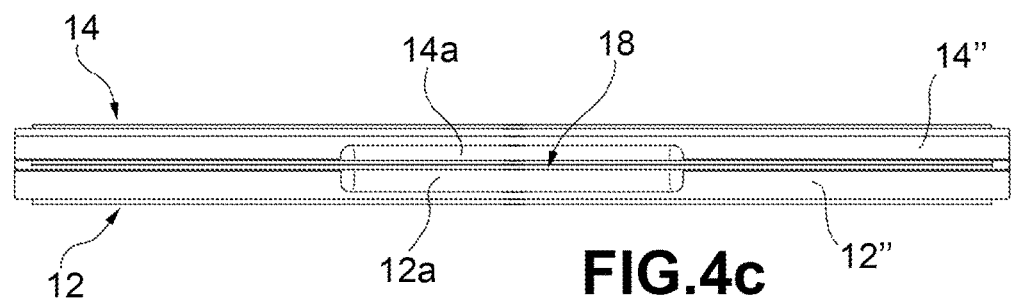
Figure 4D:
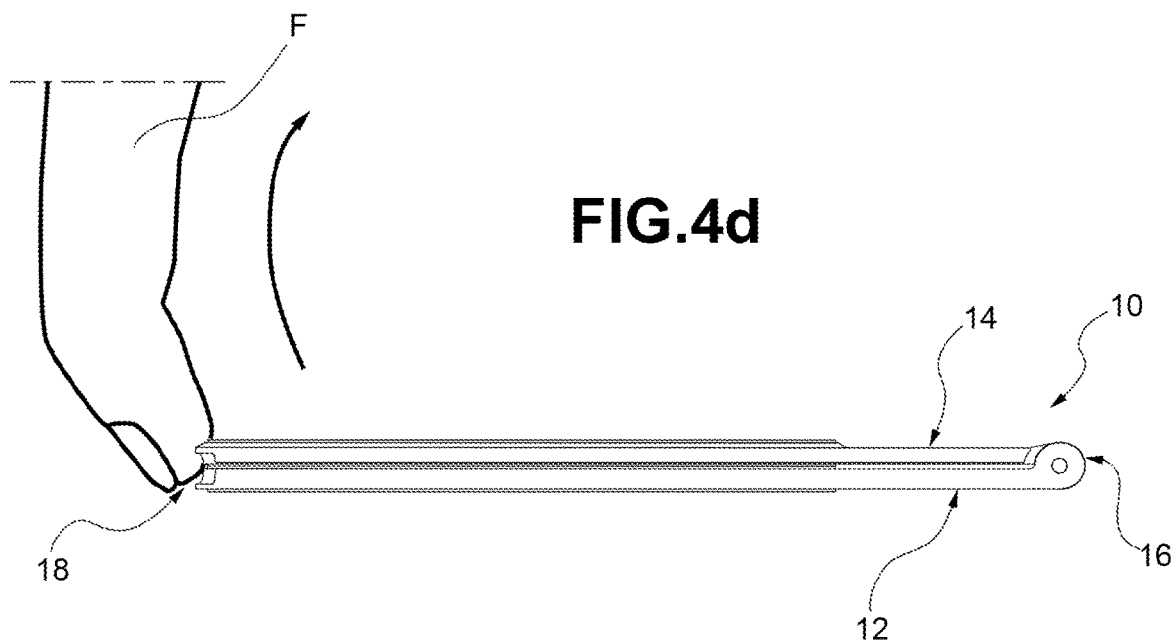
FIG. 4d shows the intervention of a user to bring the device into the configuration of use.

A supporting device according to the present invention for a portable processing and/or telecommunication apparatus or accessory is shown with its general features in FIGS. 3a and 3b and denoted as a whole by 10.

The supporting device comprises a first portion 12 adapted to be supported by a supporting structure, e.g., adapted to be coupled to a supporting structure (not shown here), and a second portion 14 adapted to retain an apparatus or accessory (not shown here). The first and second portions 12, 14 are made as plate elements and joined together in a pivotable manner through at least one hinge 16 that allows the rotation of one portion with respect to the other around a hinge axis X. In particular, the first and second portions 12, 14 are hinged along portions of a relevant edge 12', 14' that are mutually parallel and parallel to the hinge axis so that the supporting device is configured to open like a book from the configuration of minimum size in which the first and second portions 12 and 14 are superimposed and facing each other (shown in FIGS. 4a-4d) to a selected configuration of use, for example the configuration shown in FIGS. 3a, 3b, wherein the portion 14 is rotated by a selectable angle α with respect to the portion 12 so as to form an inner angle β between the two portions. Operationally, the rotation of the portion 14 with respect to the portion 12 may be by an angle less than, equal to, or greater than 180°.

Advantageously, the first and second portions 12, 14 have congruent shapes so that when the supporting device is closed in the configuration of minimum size neither of said portions protrudes from the profile of the other. The first and the second portion may be interchangeable in one embodiment of the device.

With reference to FIGS. 4a-4d, segments of the edge 12", 14" of both portions 12, 14, located on the opposite side to the hinge, have corresponding notches 12a, 14a facing each other in the configuration of minimum size of the device so as to form a recess 18 in one lateral face of the device. The recess 18 is adapted to facilitate the engagement of a finger F of a user, as shown schematically in FIG. 4d, to separate the portions 12, 14 and open the device 10 in a configuration of use.

Figure 5:
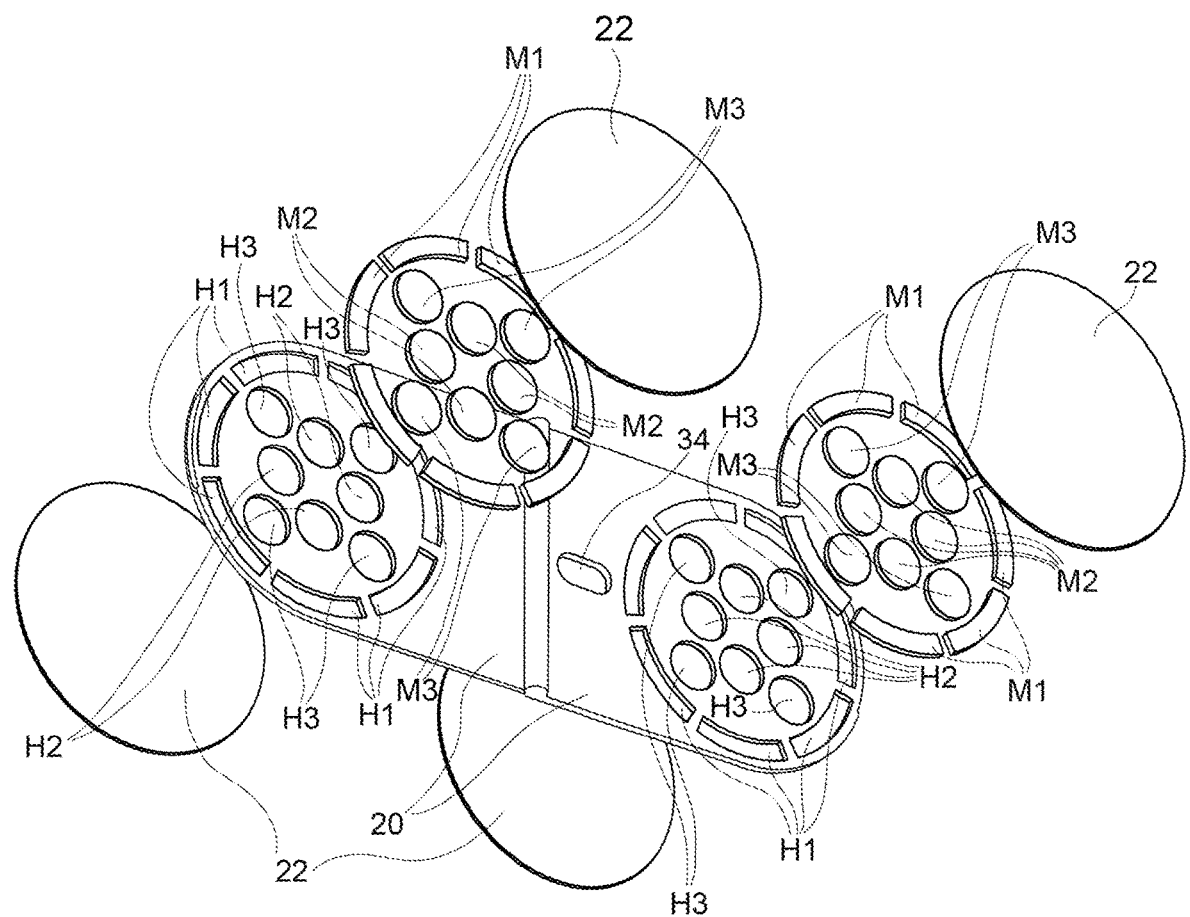
FIG. 5 is an exploded perspective view of the supporting device of the present invention, showing its main components.
Figure 6:
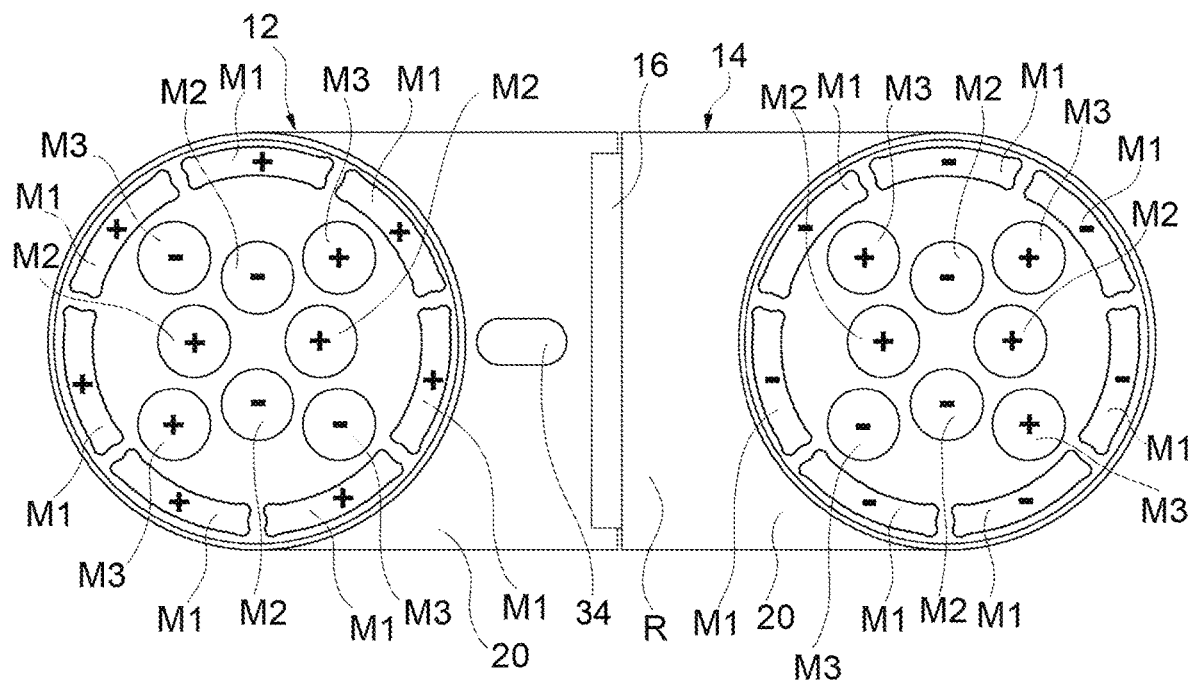
FIG. 6 is a cross-sectional front view of the supporting device of the present invention, showing its arrangement of magnetic elements.
Figure 7:
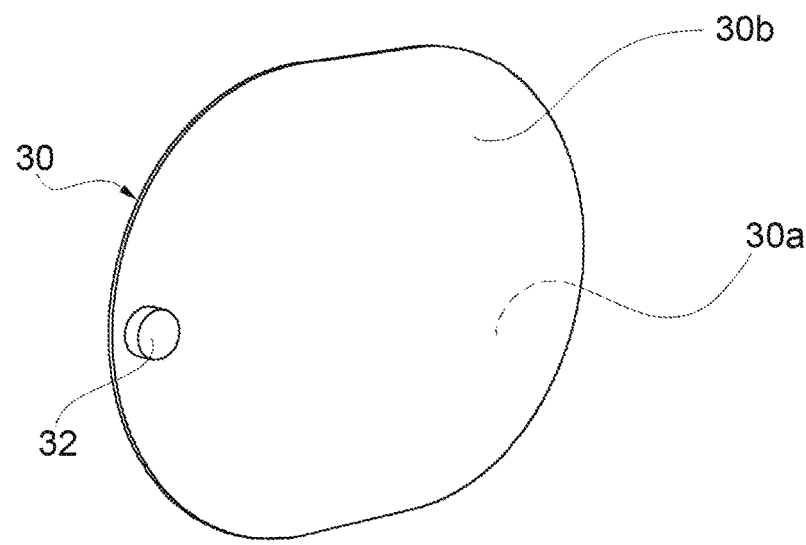
FIG. 7 is a perspective view of an element of the device of the present invention intended for attachment to a supporting structure.

The main components constituting the supporting device are shown in FIGS. 5 and 6 and described below with reference to these figures.

The first portion 12 and the second portion 14 each comprise a rigid main body 20, for example, a milled aluminum metal main body, bearing a plurality of housings, preferably in the form of through-holes (denoted as H1, H2, and H3 in the figure, the significance of this distinction appearing clear in the discussion hereinafter) adapted to receive respective magnetic elements (denoted as M1, M2, and M3 in the figure, the significance of this distinction appearing clear in the discussion hereinafter), for example magnets with magnetization N52. The hinge may, for example, be constructed of steel. The first portion 12 and the second portion 14 further comprise a pair of covering elements 22 applied on opposite faces of the main body 20 at the magnetic elements, i.e., the area arranged to receive in contact and magnetically retain an apparatus or accessory. The covering elements are adapted to cover on both faces the housings engaged by the magnetic elements and do not interfere with the magnetic field generated by the magnetic elements. Each covering element 22 comprises a first layer of rigid material facing toward the main body 20 of the relevant plate element and adapted to adhere firmly thereto, and a second layer of soft material facing externally to the body 20 in the case of the portion 14 adapted to receive in contact the portable processing and/or telecommunication apparatus or accessory and to limit its sliding.

Advantageously, the first and second portions 12, 14 of the supporting device include, respectively, a first plurality and a second plurality of magnetic elements of equal number, symmetrically arranged with respect to the hinge axis X so that symmetrically corresponding magnetic elements of the first and second portions are arranged facing each other in a configuration of minimum size of the device. In a currently preferred embodiment, symmetrically corresponding magnetic elements are also congruent with each other.

Specifically, each portion 12, 14 of the device includes a first set of magnetic elements M1 arranged circumferentially and a second set of magnetic elements arranged in a checkerboard or quincunx pattern within a region defined by the circumferential arrangement of the first set of magnetic elements M1. The first set of magnetic elements is arranged according to an arrangement compatible with Magsafe™ magnetic technology from Apple™. Advantageously, an accessory metal ring adapted to adhere to the shell of an apparatus or accessory to be supported, for example an apparatus or accessory with no metal parts, may be provided with the supporting device. The second set of magnetic elements includes a first sub-set of magnetic elements M2 for supporting apparatuses or accessories that are not compatible with Magsafe™ magnetic technology from Apple™ (for example, for retaining apparatuses and accessories provided with a metal shell or insert through which the magnetic field lines extending between pairs of magnetic elements of opposite polarity in the sub-set are closed) and a second sub-set of magnetic elements M3 to make the device easier to open.

As shown in FIG. 6, the first portion 12 of the supporting device includes a first arrangement of magnetic elements M1 having a same, first polarity (denoted by + in the figure), and the second portion 14 of the supporting device includes a first symmetrical arrangement of magnetic elements M1 having a same, second polarity (denoted by − in the figure) opposite to said first polarity of the arrangement of magnetic elements M1 of the first portion.

The first portion 12 of the supporting device further includes a second arrangement of magnetic elements (comprising the magnetic elements M2 and a part of the magnetic elements M3), each having a relevant polarity (denoted by + and − in the figure), and the second portion 14 of the supporting device includes a second symmetrical arrangement of magnetic elements (comprising the magnetic elements M2 and a part of the magnetic elements M3), each having a relevant polarity coincident with the polarity of the symmetrically corresponding magnetic elements of the second arrangement of magnetic elements of the first portion 12.

Finally, the first portion 12 includes at least a third magnetic element (belonging to the sub-set of magnetic elements M3) having a first polarity, and the second portion 14 includes at least a third magnetic element (belonging to the sub-set of magnetic elements M3) arranged symmetrically to the third magnetic element of the first portion, having a second polarity opposite to the first polarity of the third magnetic element of the first portion.

In the illustrative embodiment, in the configuration of minimum size, the magnetic elements M1 of the first portion 12 are adapted to attract the magnetic elements M1 of the second portion 14, the magnetic elements M2 of the first portion 12 are all repulsive toward the magnetic elements M2 of the second portion 14, and the magnetic elements M3 of the first portion 12 are all repulsive toward the magnetic elements M3 of the second portion 14 except for one. This combination of magnetic elements allows the supporting device to remain magnetically closed, but at the same time to be opened by a user without the need to apply excessive force in the operation of separating the two portions shown in FIG. 4d. The number of the magnetic elements of the sub-set M3 respectively dedicated to generating an attractive force and a repulsive force may vary, depending on the weight supported by the hinge. For example, for a hinge capable of supporting a weight of 550 g+/−50 g, only one attractive magnet is provided in the sub-set M3.

A person skilled in the art will understand that the functions of the sub-set of magnetic elements M2 and of the sub-set of magnetic elements M3 may be interchanged without departing from the principle of the invention.

In an advantageous embodiment of the present invention, the supporting device includes a metal fixing plate 30 to secure the device magnetically to an area of a supporting structure. The fixing plate may be magnetically coupled to either the first portion 12 or to the second portion 14, and comprises a flat metal body having a first face 30a bearing an adhesive material designed to stably adhere to the supporting structure, regardless of the material constituting that structure, and an opposite second face 30b having at least one protruding alignment formation 32, such as a cylindrical pin.

The fixing plate allows the device to be applied to any type of surface and material of any supporting structure, although the first portion 12 of the device may be independently applied magnetically, in a removable manner, to any metal surface. A plurality of fixing plates joined to different (non-metallic) supporting structures allows the supporting device to be applied to each of them and the supporting device to be transferred between them smoothly and quickly.

The first portion 12 of the device has an alignment hole 34, either through or blind, adapted to receive the protruding alignment formation 32 of the fixing plate 30 when the device is magnetically coupled via the first portion 12 to the fixing plate. This allows for the proper positioning of the device and prevents its rotation accidentally or due to the weight of the supported apparatus or accessory. Although not shown, the second portion may also provide a similar alignment hole. Advantageously, the alignment hole 34 has, along one of the two dimensions, and precisely along the axis of longitudinal symmetry of the device orthogonal to the hinge axis X, a greater extension with respect to the protruding alignment formation 32, so as to allow additional freedom of adjustment in the positioning of the device, for example to accommodate the size of the apparatus to be supported in relation to the edge of a computer screen (as better shown in FIGS. 8a-8d). Advantageously, an alignment through-hole may also be used as a feed-through hole for the wired power supply of apparatuses or accessories supported by the device, when the device is not engaged with a fixing plate.

FIGS. 8a-8d show a sequence of use of the supporting device of the present invention.

Figure 8A:
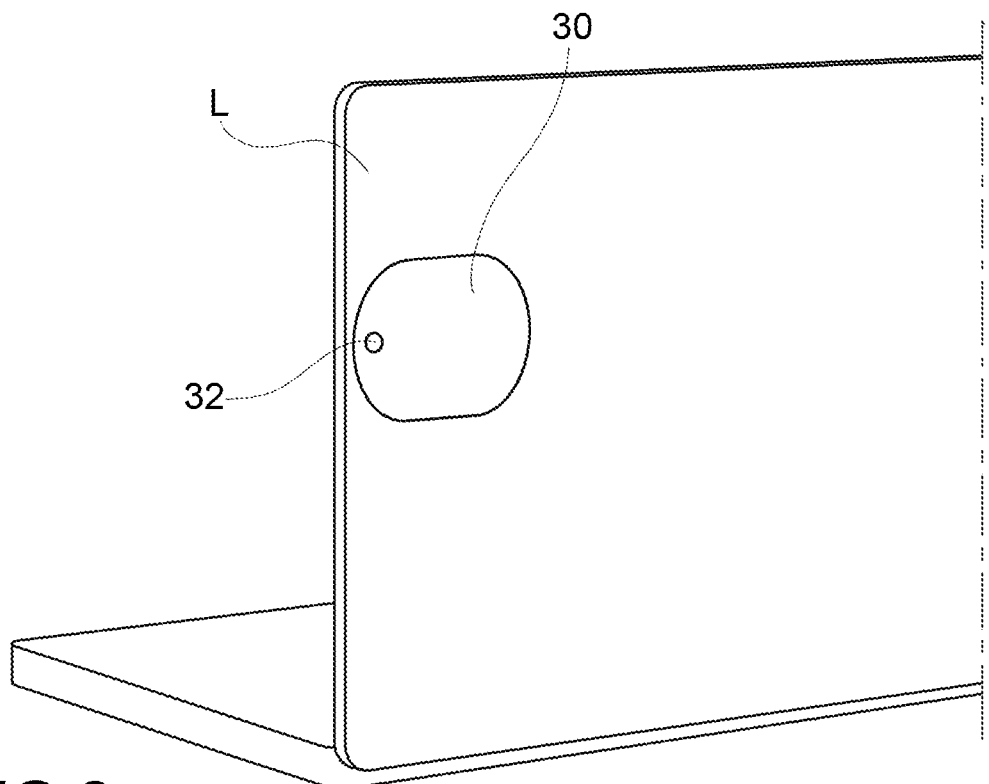
FIGS. 8a-8d show sequentially the application of the device of the present invention to a computer display screen and the coupling of a portable telecommunication apparatus thereto.
Figure 8B:
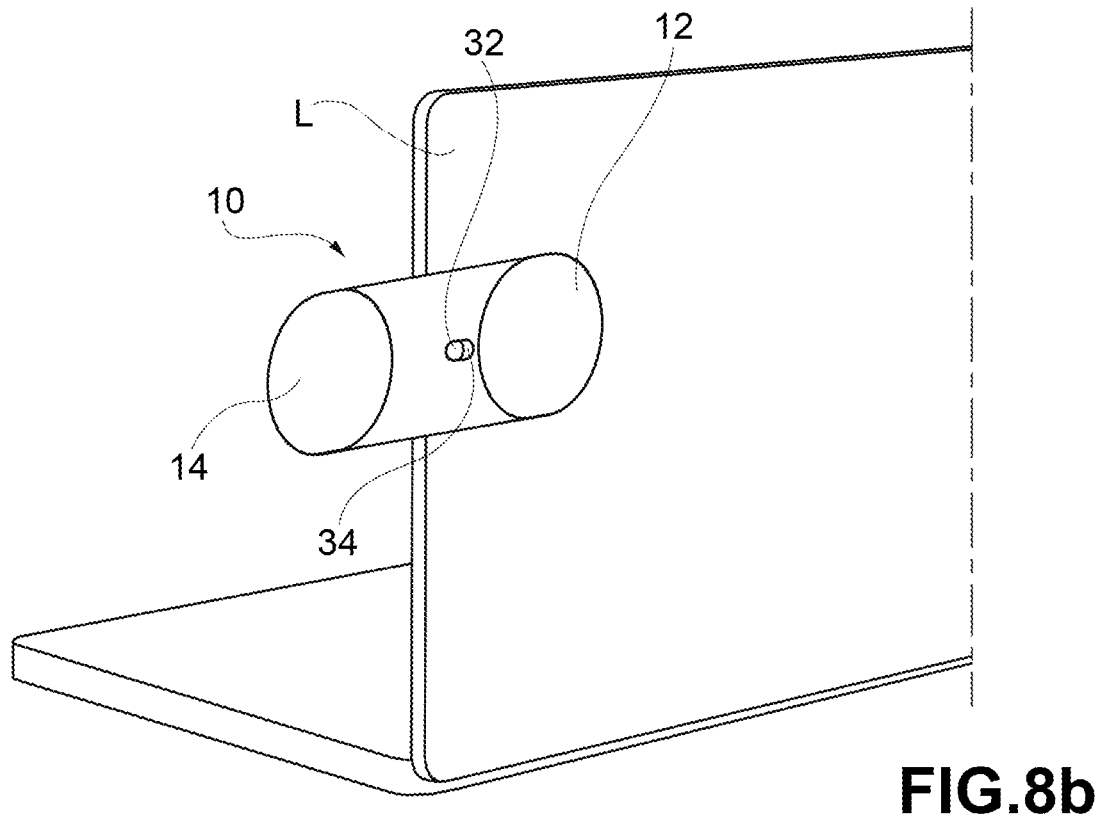
Figure 8C:
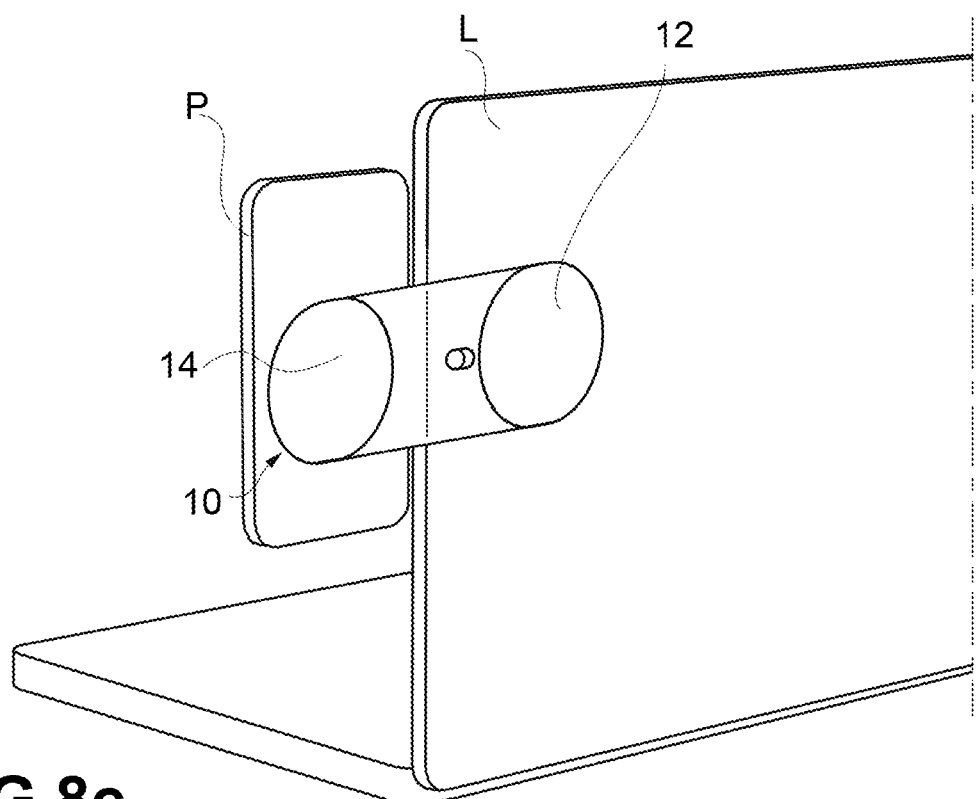
Figure 8D:
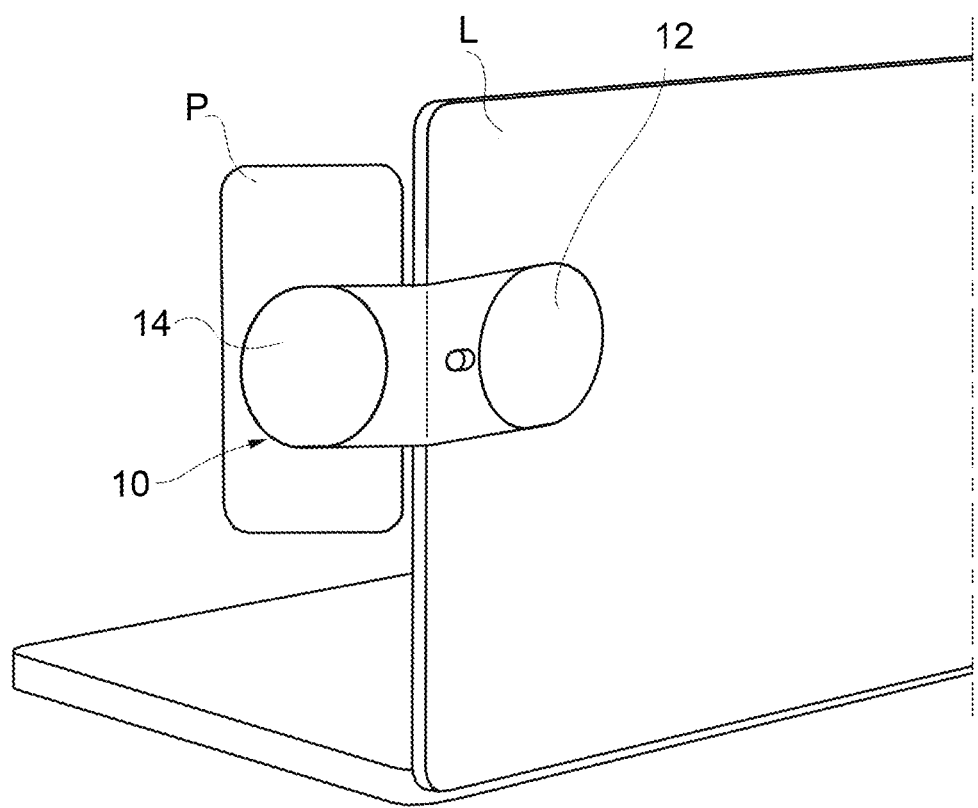
Figure 10:
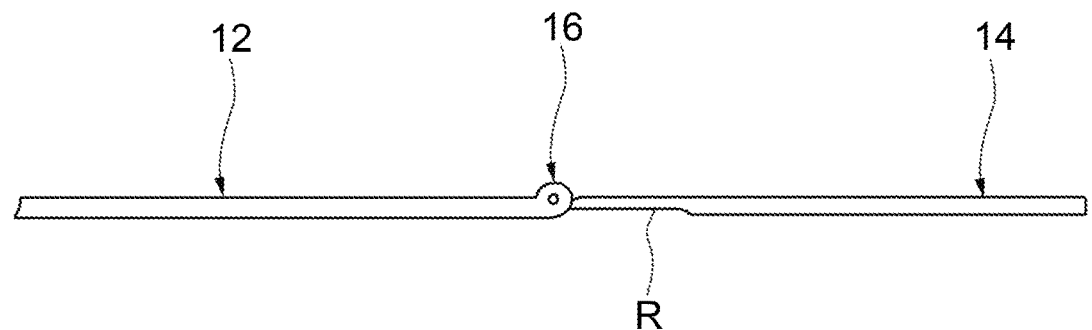
FIGS. 10 and 11 show a feature of the device of the present invention.
Figure 11:
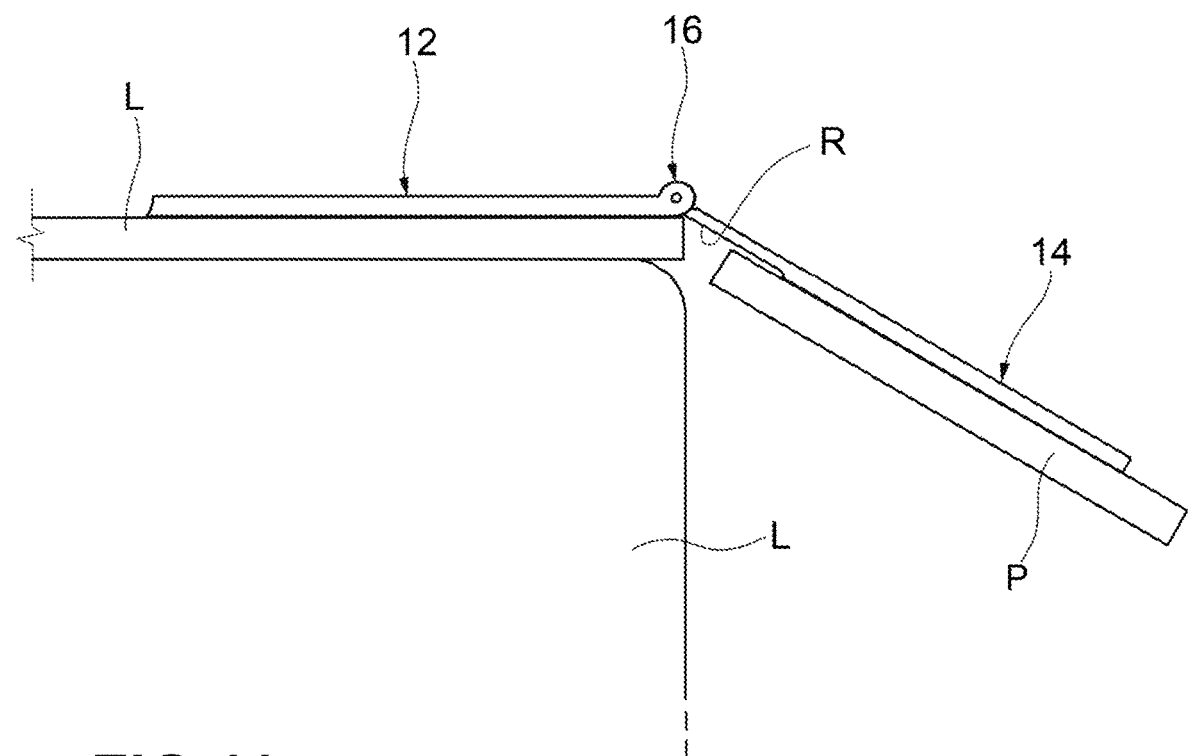

In FIG. 8a, a fixing plate 30 is stably coupled by means of adhesive to the rear surface of a display screen of a laptop L near one of its edges. The first portion 12 of the supporting device 10 in FIG. 8b is magnetically coupled thereto, to which device a smartphone P is temporarily secured, again by magnetic coupling (FIG. 8c). The smartphone P may be oriented with respect to the screen of the laptop L, in particular it may be tilted with respect to the plane of the screen of the laptop (FIG. 8d) by rotating the second portion 14 of the device with respect to the first portion 12 by acting on the hinge 16. In this embodiment, by arranging the device horizontally, a smartphone may be paired laterally with a laptop screen, in a vertical orientation.

The supporting device may be applied to the fixing plate, and in general to a supporting structure, in the configuration of minimum size, whereby it may not protrude from the profile of the supporting structure, and is opened in the configuration of use as needed by rotating the second portion 14 in the half-space behind the supporting structure, such as by an angle of 180° or more as in the example case.

FIGS. 9a-9d show other possible uses of the supporting device of the present invention.

In particular, as shown in FIG. 9a, through the use of the fixing plate, the device may be oriented vertically with respect to the laptop screen, for example by simply coupling its first portion 12 to the fixing plate 30 according to an orientation rotated by 90° with respect to the example in FIG. 8b, switching the positioning of the mobile device from vertical (portrait) mode to horizontal (landscape) mode by employing a single supporting device, and simply rotating the portion 12 of the device on the plate 30. This allows a smartphone P coupled on top of the screen of a laptop to be supported in landscape orientation.

Due to the structure of the device and in particular the placement of the magnetic elements, an attractive force is exerted on both sides of the device, whereby a smartphone P may be supported by the device on the opposite side so that the rear camera faces the user of the laptop in the configuration in FIG. 9b. This configuration may also be achieved by applying the second portion 14 of the device to the fixing plate 30 and supporting the smartphone P by means of the first portion 12.

FIG. 9c shows another example of using the device, and in particular a pair of devices, to support a tablet T or similar apparatus of greater weight than a smartphone, in an otherwise stable condition.

FIG. 9d shows an alternative use of the device of the present invention as a support resting on a horizontal work surface S at an angle which is variable as desired, in this case without the need for an adhesive or magnetic coupling to that surface.

Other examples that are not depicted of applications of the device of the invention are the coupling of apparatuses or accessories to vertical supporting structures of all kinds, such as a wall, or to other similar or different supporting devices, such as a tripod, possibly by means of interconnecting accessories that provide a metal or magnetic surface compatible with the magnetic arrangements of the first portion or second portion 12, 14 of the device.

Advantageously, in order to ensure that an optimal inclination angle of an apparatus or an accessory with respect to the supporting structure with which it is associated may be achieved, the main body 20 of the second portion 14 has, near the hinge axis X, a region R of reduced thickness that defines a recess in the surface of the second portion facing away from the first portion in the configuration of minimum size. The recess runs along the entire transverse extension of the portion 14, i.e., along the entire hinge 16. In a configuration in which the second portion 14 is rotated from the configuration of minimum size to an angle greater than 180° with respect to the first portion 12, this feature allows the second portion to reach a greater inclination angle with respect to the supporting structure to which the device 10 is applied before interference occurs between the second portion of the device and said structure. In the case, for example, of using the device for arranging a portable processing or telecommunication apparatus side by side with a computer display screen, this feature ensures that the second portion of the device may be freely rotated up to a maximum of 280 degrees with respect to the first portion. A person skilled in the art will understand that this feature may also be provided in the main body 20 of the first portion 12.

It should be noted that the proposed embodiment of the present invention in the foregoing discussion is provided merely by way of example and not in limitation of the present invention. A person skilled in the art will easily be able to implement the present invention in different embodiments that do not, however, deviate from the principles outlined herein. This applies in particular to the possibility of applying the supporting device of the invention to other supporting structures not mentioned in this discussion, for the support of other apparatuses or accessories not mentioned in this discussion. Moreover, the supporting device of the present invention may also be used independently or in combination with other similar supporting devices to make a modular system and create, for example, complex charging stations (e.g., to charge a smartphone, a pair of headphones, or a smartwatch in an orderly manner) or table lamps, possibly even with a wireless charging function for one or more apparatuses. In effect, the second portion of the device is adapted to magnetically couple to the first portion of a second, similar device to achieve more complex configurations of two or more devices, for example, articulated about multiple axes and with a greater number of magnetic support areas available to apparatuses and accessories.

Of course, without prejudice to the principle of the invention, the embodiments and the details of execution may vary widely with respect to what has been described and illustrated purely by way of non-limiting example, without thereby departing from the scope of protection as described and claimed herein.

What is claimed is:

1. A supporting device for a portable processing and/or telecommunication apparatus or an accessory, comprising a first portion adapted to be supported by a supporting structure and a second portion comprising magnetic elements for retaining said portable processing and/or telecommunication apparatus or said accessory, wherein the first and second portions are joined together in a pivotable manner through at least one hinge that allows a rotation of one portion of the first and second portions with respect to the other portion around a hinge axis, whereby the supporting device is adapted to take on a first configuration of minimum size, in which said second portion is superimposed on the first portion, and at least a second configuration of use in which said second portion is rotated at a selectable angle with respect to the first portion, wherein said first portion and said second portion are hinged along portions of a respective edge that are mutually parallel and parallel to the hinge axis so that the supporting device opens like a book from the first configuration of minimum size to a selected configuration of use, wherein said first portion and said second portion are made as plate elements, each of which comprises a rigid main body comprising a plurality of seats adapted to receive respective magnetic elements, and a pair of covering elements applied on opposite faces of the rigid main body at the magnetic elements, not interfering with a magnetic field generated by said magnetic elements, and wherein each covering element comprises a first layer of rigid material adapted to stably adhere to the rigid main body of a respective plate element and a second layer of soft material adapted to receive in contact said portable processing and/or telecommunication apparatus or said accessory.

2. The supporting device of claim 1, wherein said first and second portions respectively include a first plurality and a second plurality of magnetic elements of equal number, said magnetic elements being symmetrically arranged with respect to the hinge axis so that symmetrically corresponding magnetic elements of the first and second portions are arranged facing each other in the first configuration of minimum size of the supporting device.

3. The supporting device of claim 2, wherein said first portion includes an arrangement of first magnetic elements having a same first polarity, and said second portion includes a symmetrical arrangement of first magnetic elements having a same second polarity, opposite to said first polarity of the arrangement of first magnetic elements of the first portion;

and wherein said first portion includes an arrangement of second magnetic elements each having a respective polarity, and said second portion includes a symmetrical arrangement of second magnetic elements each having a respective polarity coincident with the polarity of symmetrically corresponding magnetic elements of the arrangement of second magnetic elements of the first portion.

4. The supporting device of claim 3, wherein the magnetic elements of said arrangements of first magnetic elements of the first and second portions of the supporting device are arranged circumferentially.

5. The supporting device of claim 3, wherein the magnetic elements of said arrangements of second magnetic elements of the first and second portions of the supporting device are arranged in a checkerboard or quincunx pattern.

6. The supporting device of claim 2, wherein said first portion includes at least a third magnetic element having a first polarity and said second portion includes at least a third magnetic element arranged symmetrically to the third magnetic element of the first portion, having a second polarity, opposite to said first polarity of the third magnetic element of the first portion.

7. The supporting device of claim 1, wherein said first and second portions have a congruent shape, and portions of a respective edge on an opposite side to the hinge have corresponding notches facing each other in the first configuration of minimum size of the supporting device so as to form a recess adapted to facilitate an engagement of a finger of a user.

8. The supporting device of claim 1, further comprising a fixing plate for securing the supporting device on an area of said supporting structure, the fixing plate being magnetically couplable to said first portion or said second portion and comprising a flat metal body having a first face bearing an adhesive material configured to stably adhere to said supporting structure and a second, opposite face bearing at least one protruding alignment formation.

9. The supporting device of claim 8, wherein said first portion comprises an alignment hole adapted to receive said at least one protruding alignment formation of the fixing plate in a magnetic coupling configuration of the first portion of the supporting device with the fixing plate.

10. The supporting device of claim 1, wherein the rigid main body of at least said second portion in proximity of the hinge axis comprises a region of reduced thickness that defines a recess in a surface of at least said second portion facing away from the first portion in the first configuration of minimum size.

* * * * *